(12) United States Patent
Yamanaka et al.

(10) Patent No.: US 8,136,818 B2
(45) Date of Patent: Mar. 20, 2012

(54) OIL SEAL

(75) Inventors: Satoshi Yamanaka, Fukushima (JP); Takehiro Nakagawa, Fukushima (JP); Masayuki Tanida, Fukushima (JP); Hideharu Hyakutake, Fukushima (JP); Hiroki Matsui, Fukushima (JP); Hideyuki Furuyama, Fukushima (JP); Go Kanzaki, Fukushima (JP); Shinya Takeda, Fukushima (JP); Kei Sasaki, Fukushima (JP); Akira Yamaguchi, Fukushima (JP)

(73) Assignee: Nok Corporation, Tokyo (JP)

( * ) Notice: Subject to any disclaimer, the term of this patent is extended or adjusted under 35 U.S.C. 154(b) by 716 days.

(21) Appl. No.: 12/223,671

(22) PCT Filed: Feb. 2, 2007

(86) PCT No.: PCT/JP2007/051762
§ 371 (c)(1),
(2), (4) Date: Dec. 12, 2008

(87) PCT Pub. No.: WO2007/091485
PCT Pub. Date: Aug. 16, 2007

(65) Prior Publication Data
US 2009/0224485 A1 Sep. 10, 2009

(30) Foreign Application Priority Data

Feb. 6, 2006 (JP) .................................. 2006-028335
Apr. 21, 2006 (JP) .................................. 2006-117848
Aug. 25, 2006 (JP) .................................. 2006-229096

(51) Int. Cl.
*F16J 15/32* (2006.01)

(52) U.S. Cl. .......................... 277/424; 277/563; 277/574
(58) Field of Classification Search .................. 277/423, 277/424, 563, 574
See application file for complete search history.

(56) References Cited

U.S. PATENT DOCUMENTS

| 2,162,486 | A | * | 6/1939 | Le Tourneau | 415/110 |
| 2,478,649 | A | * | 8/1949 | Wightman | 277/424 |
| 3,021,161 | A | * | 2/1962 | Rhoads et al. | 277/568 |
| 3,682,488 | A | * | 8/1972 | Matsushima | 277/551 |
| 4,005,769 | A | * | 2/1977 | Itoh | 188/315 |
| 4,746,128 | A | * | 5/1988 | Freiwald | 277/349 |

(Continued)

FOREIGN PATENT DOCUMENTS

| JP | S57-93663 | 6/1982 |
| JP | S61-146660 | 9/1986 |
| JP | H1-109651 | 7/1989 |

(Continued)

OTHER PUBLICATIONS

International Search Report dated Mar. 20, 2007.

*Primary Examiner* — Alison Pickard
(74) *Attorney, Agent, or Firm* — Jacobson Holman PLLC

(57) ABSTRACT

A seal lip of an oil seal is in slidable contact with a peripheral surface of a shaft. A lubricating oil supply section for collecting adhered oil and dropping it on the shaft is provided at a forward end portion of an installation section. The lubricating oil supply section has projections formed on the inner peripheral surface of the installation section to collect oil on the surface thereof. The surface of each projection has a recess for temporarily accumulating oil. Guidance projections, or a slope for collecting the oil, and dams are formed on a forward end face of the installation section to block the oil flowing down along the circumferential direction on the forward end face and guides the oil toward each projection.

2 Claims, 20 Drawing Sheets

U.S. PATENT DOCUMENTS

| | | | | |
|---|---|---|---|---|
| 4,906,009 A | * | 3/1990 | Saitoh | 277/349 |
| 4,928,979 A | * | 5/1990 | Nagasawa | 277/348 |
| 5,022,659 A | * | 6/1991 | Otto | 277/309 |
| 5,308,087 A | * | 5/1994 | Schmitt | 277/351 |
| 5,492,416 A | * | 2/1996 | Gabelli et al. | 384/462 |
| 6,293,558 B1 | * | 9/2001 | Crapart | 277/552 |
| 6,676,132 B1 | * | 1/2004 | Takebayashi et al. | 277/560 |

FOREIGN PATENT DOCUMENTS

| | | |
|---|---|---|
| JP | H4-39362 | 4/1992 |
| JP | 10-009119 | 1/1998 |
| JP | 11-351402 | 12/1999 |
| JP | 2000-291808 | 10/2000 |
| JP | 2003-056718 | 2/2003 |
| JP | 2005-282841 | 10/2005 |

* cited by examiner

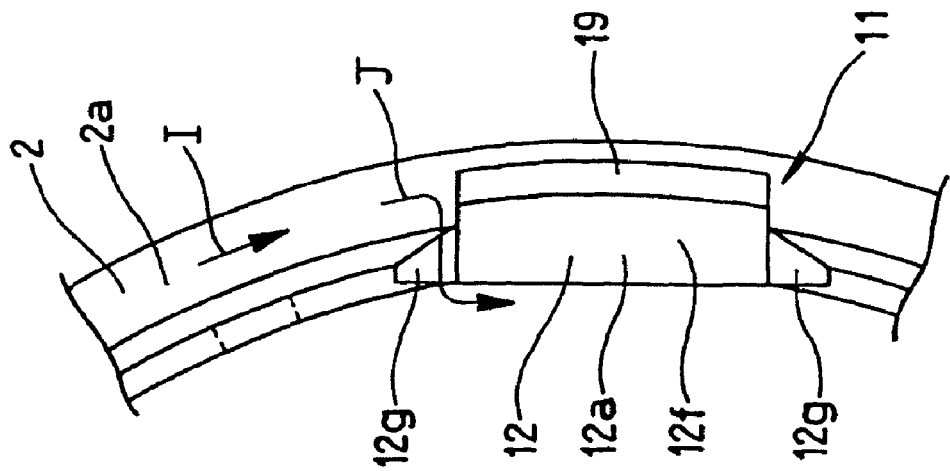
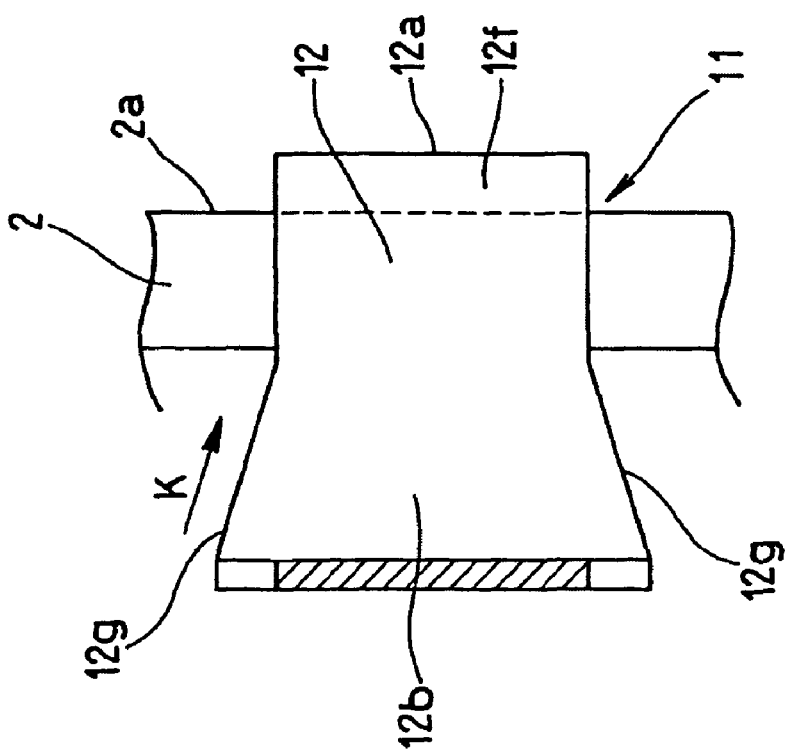

OIL SEAL

This is a national stage of the International Application No. PCT/JP2007/051762 filed Feb. 2, 2007 and published in Japanese.

BACKGROUND OF THE INVENTION

1. Field of the Invention

The present invention relates to an oil seal which is a kind of sealing device, particularly to an oil seal configured so as to improve the lubricant oil supplying performance to the seal lip sliding portion. The oil seal of the present invention is used in the technical fields relating to automobiles, or used in general-purpose machines or the like.

2. Description of the Conventional Art

For example, a well known conventional oil seal 51 is configured such that an annular installation section 52 fitted to a housing (not shown) and a seal lip 53 provided slidably and in closely contact with the circumference of a shaft not shown inserted to an inner peripheral surface of a shaft hole of the housing are integrally formed, as shown in FIG. 22. In such oil seal 51, supply of lubricant oil to the sliding portion 54 of the seal lip 53 is required to improve durability of the seal lip 53 which is made of a predetermined rubber-like elastic body to reduce an amount of wear due to sliding movement thereof. However, in the case that oil as an object to be sealed exists in a misty state for example, the lubricating property of sliding portion of the seal lip is tend to be poor, causing early abrasion and heat generation or the like. As a result, there is the problem that life time of the seal is remarkably shortened.

The conventional art is disclosed in Japanese unexamined patent publication No. 2005-282841 and Japanese unexamined patent publication No. 2003-056718.

SUMMARY OF THE INVENTION

Problem to be Solved by the Invention

In view of the above problem, it is an object of the present invention to provide an oil seal capable of improving durability of a seal lip by enhancing lubricant oil supplying performance to a sliding portion of the seal lip.

Means for Solving the Problem

To achieve the above object, an oil seal according to a first aspect of the present invention comprises an annular installation section fitted to a housing and a seal lip provided slidably in close contact with a peripheral surface of a shaft, wherein the oil seal is characterized in that a lubricant oil supply section is provided at a forward end region of the installation section to collect oil adhered thereon and make the oil drop on the shaft.

Further, an oil seal according to a second aspect of the present invention comprises an annular installation section fitted to a housing and a seal lip provided slidably in close contact with an peripheral surface of a shaft, wherein the oil seal is characterized in that a lubricant oil supply section is provided at a forward end region of the installation section to collect oil adhered thereon and to supply the oil to a sliding portion between the shaft and seal lip.

According to a third aspect of the present invention, the oil seal of the first or second aspect is further characterized in that the lubricant oil supply section has a plurality of projections provided circumferentially on an inner peripheral surface of the installation section so that the oil is collected on the surfaces of the projections.

According to a fourth aspect of the present invention, the oil seal of the third aspect is further characterized in that a recess for temporarily accumulating the oil is provided on the surface of the projection.

According to a fifth aspect of the present invention, the oil seal of the third aspect is further characterized in that guidance projections are provided on the surface of the projection to collect the oil.

According to a sixth aspect of the present invention, the oil seal of the third aspect is further characterized in that an inclined face is provided on the surface of the projection to collect the oil.

According to a seventh aspect of the present invention, the oil seal of the third aspect is further characterized in that forward end faces of the projections are flushed with a forward end face of the installation section without having step portions between those faces.

According to a eighth aspect of the present invention, the oil seal of the third aspect is further characterized in that an inner peripheral edge of the forward end face of the projection is formed having a flat-shaped section connecting both ends thereof instead of a circular arc shape.

According to a ninth aspect of the present invention, the oil seal of the third aspect is further characterized in that dams are provided at the forward end face of the installation section to block the oil flowing down circumferentially on the forward end face of the installation section and to guide the oil toward the projections.

According to a tenth aspect of the present invention, the oil seal of the third aspect is further characterized in that an oil receiving piece is formed integrally with the seal lip at an outer peripheral region of the seal lip so as to extend radially outward from the seal lip, so that the oil collected on the projections is guided toward the seal lip through the oil receiving piece.

The oil seal of the first aspect of the present invention having above-mentioned structure is configured so that the lubricant oil supply section is provided on the forward end region of the installation section of the oil seal to collect the oil adhered thereon and make the oil drop on the shaft, thereby the sliding portion of the seal lip can be lubricated by the dropped oil. Further, the oil seal of the second aspect of the present invention is configured so that the lubricant oil supply section is provided on the forward end region of the installation section of the oil seal to collect the oil adhered thereon and to supply the oil on the sliding portion between the shaft and seal lip, thereby the sliding portion of the seal lip can be lubricated by the supplied oil. Although it is common for the first and second aspects of the inventions to supply the lubricant oil to the sliding portion of the seal lip, the oil seal according to the first aspect is configured such that the oil is dropped from the lubricant oil supply section on the shaft and then supplied through the shaft to the sliding portion of the seal lip, while the oil seal according to the second aspect includes such configuration that the oil is supplied to the sliding portion of the seal lip from the lubricant oil supply section by way of the seal lip itself in addition to the same oil supplying route as that of the oil seal according to the first aspect.

The lubricant oil supply section is configured such that the oil existing in a fine oil mist state within a space as an object to be sealed is adhered on the surface of the lubricant oil supply section, and the collected oil becomes oil drops, and then supplied to the sliding portion of the seal lip. Therefore, as a specific configuration of the lubricant oil supply section, it is preferable to provide a projection on an inner peripheral surface of the installation section to ensure comparatively larger area on which the oil is adhered, and the oil is collected on the surface of the projection. In this case, if the projection is formed in an annular shape over the entire circumference of the oil seal, there is a problem that the collected oil flows away in the circumferential direction along the surface of the projection and not drop on the shaft. Therefore, it is preferable that the projection is divided into a plurality of projections formed circumferentially on the oil seal to prevent the oil from flowing away along the surface of the projection, thereby the oil can be collected on each projection, and the oil collected on certain projections that are disposed above the shaft can be dropped on the shaft.

The projection has a definite amount of volume, and the structure having such projection is effective to enlarge the surface area on which the oil is adhered. In the case that a plurality of projections are formed circumferentially on the inner peripheral surface of the installation section of the oil seal, each projection is generally formed in an elongated shape extending in the axial direction with an axially directed end face (forward end face), and such axially directed end face faces the space as an object to be sealed, thereby larger amount of oil can be adhered on this axially directed end face among others. Further, the oil adhered on the axially directed end face of the installation section of the oil seal often flows to the projections, and depending on a shape of a housing on which the oil seal is installed, the oil adhered on the housing surface may often flow to the projection via the installation section of the oil seal. Therefore, in any case, it is preferable to provide additionally the following structure to collect the oil as much as possible.

It is preferable to provide a recess on the surface of the projection to temporarily accumulate the oil (the fourth aspect). With such structure, the oil can be accumulated in an inner space of the recess, thereby it becomes possible to collect the oil as much as possible.

It is preferable to provide guidance projections on the surface of the projection to collect the oil thereon (the fifth aspect). With such structure, the oil can be collected along the guidance projections, thereby it becomes possible to collect the oil as much as possible.

It is preferable to provide an inclined face on the surface of the projection to collect the oil thereon (the sixth aspect). With such structure, the oil can be collected along the inclined face, thereby it becomes possible to collect the oil as much as possible.

It is preferable to configure such that forward end faces of the projections are flushed with a forward end face of the installation section without having steps (the seventh aspect). If there are steps between the forward end faces of the projections and the forward end face of the installation section (boundary), there is a problem that the oil flowing is prevented, and the oil will not easily flow from the forward end face of the installation section to the forward end faces of the projections. By the configuration that the respective forward end faces of the projections and the installation section are flushed with each other, the oil flowing cannot be prevented, and the oil can easily flow from the forward end face of the installation section to the forward end faces of the projections, thereby it becomes possible to collect the oil as much as possible.

It is preferable to form an inner peripheral edge of the forward end face of the projection having a flat-shaped section connecting both ends thereof instead of a circular arc shape, i.e. the inner peripheral edge of the forward end face of the projection is not formed having a circular arc shaped section concentric with the oil seal, but formed having a flat-shaped section connecting the both ends straightly (the eighth aspect). With such structure, the area of the forward end face of the projection can be enlarged compared to the case that the inner peripheral edge of the forward end face of the projection is formed having the circular arc shaped section, thereby it becomes possible to collect the oil as much as possible.

It is preferable to provide dams on the forward end face of the installation section to block the oil flowing away circumferentially on the forward end face of the installation section and to guide the oil toward the projections (the ninth aspect). There is a problem that the oil adhered on the forward end face of the installation section at a location other than just above the shaft will not flow toward the projections, but flow away circumferentially along the forward end face of the installation section. By the provision of such dams in the flowing route, the oil can easily flow from the installation section to the projections, thereby it becomes possible to collect the oil as much as possible.

Furthermore, it is preferable to provide an oil receiving piece as an auxiliary means, which is formed integrally with the seal lip at an outer peripheral region thereof so as to extend radially outward from the seal lip, so that the oil collected on the projections is guided toward the seal lip through the oil receiving piece, thereby smooth oil supply from the projections to the sliding portion of the seal lip can be ensured (the tenth aspect). In general, the oil receiving piece can be formed in a lip-shape, and can be formed by using a burr formed in the molding process since the oil guiding piece can be made as a thin film in view of its functionality.

Effects of the Invention

The present invention has the following effects.

According to the oil seal of the first aspect of the present invention as above-mentioned, the lubricant oil supply section is provided on the forward end region of the installation section to collect oil adhered thereon and to make the oil drop on the shaft, thereby the sliding portion of the seal lip can be lubricated by the dropped oil. Therefore, the lubricant oil supplying performance to the sliding portion of the seal lip can be enhanced, thereby durability of the seal lip can be improved, as intended.

Further, according to the oil seal of the second aspect of the present invention, the lubricant oil supply section is provided on the forward end region of the installation section to collect the oil adhered thereon and to supply the collected oil to the sliding portion between the shaft and seal lip, thereby the sliding portion of the seal lip can be lubricated by the supplied oil. Therefore, the lubricant oil supplying performance to the sliding portion of the seal lip can be enhanced, thereby durability of the seal lip can be improved, as intended.

Further, according to the oil seal of the third aspect of the present invention, as the lubricant oil supply section in the first or second aspect, the projections are provided on the inner peripheral surface of the installation section, and configured such that the oil can be collected on the surface of the projections. Therefore, it becomes possible to collect larger amount of the oil on the projections to be dropped on the shaft or supplied to the sliding portion. Further, a plurality of the projections are arranged circumferentially, thereby the oil can surely be dropped on the shaft or supplied to the sliding portion from the projection located just above the shaft.

Further, according to the oil seal of the fourth aspect of the present invention, the recess is provided on the surface of the projection. Therefore, the oil can be temporarily accumulated in the recess, thereby it becomes possible to collect the oil as much as possible.

Further, according to the oil seal of the fifth aspect of the present invention, the guidance projections are provided on the surface of the projection. Therefore, the oil can be collected along the guidance projections, thereby it becomes possible to collect the oil as much as possible.

Further, according to the oil seal of the sixth aspect of the present invention, the inclined face is provided on the surface of the projection. Therefore, the oil can be collected along the inclined face, thereby it becomes possible to collect the oil as much as possible.

Further, according to the oil seal of the seventh aspect of the present invention, the forward end faces of the projections are configured to be flushed with the forward end face of the installation section without having steps. Therefore, the oil can easily flow from the forward end face of the installation section to the projections, thereby it becomes possible to collect the oil as much as possible.

Further, according to the oil seal of the eighth aspect of the present invention, the inner peripheral edge of the forward end face of the projection is formed having a flat shaped section connecting both ends thereof straightly, instead of a circular arc shaped section line. Therefore, the area of the forward end face of the projection, to which the oil readily adheres, can be enlarged, thereby it becomes possible to collect the oil as much as possible.

Furthermore, according to the oil seal of the ninth aspect of the present invention, there are provided the dams on the forward end surface of the installation section, therefore, the oil can easily flow from forward end surface of the installation section to the projections, thereby it becomes possible to collect the oil as much as possible.

Furthermore, according to the oil seal of the tenth aspect of the present invention, the oil receiving piece is provided as an auxiliary means, which is formed integrally with the seal lip at the outer peripheral region thereof so as to extend radially outward from the seal lip. Therefore, the oil is surely supplied from the projections to the sliding portion of the seal lip through the oil receiving piece and the seal lip, thereby smooth supply of the oil can be further ensured.

DETAILED DESCRIPTION OF PREFERRED EMBODIMENT

The following embodiments are included in the present invention.

(A) An oil seal comprising a tubular installation section closely fitted to an inner peripheral surface of a housing of a device, and a seal lip extending from an inner periphery of the tubular installation section toward the side of a space as an object to be sealed, an inner peripheral portion near a forward end of said seal lip being provided slidably in close contact with an outer peripheral surface of a shaft having a horizontally extending axis and provided through the housing, wherein a liquid collecting projections are provided on an inner periphery of the tubular installation section to retain a liquid and to make the liquid to drop on a front face of the forward end portion of the seal lip.

(B) An oil seal recited in the above (A), wherein the liquid collecting projection comprises a plurality of fins so that the liquid is retained between the fins by means of capillary action.

(C) An oil seal recited in the above (A), wherein a lower surface of the liquid collecting projection is formed to have an inclined face to define a position where the liquid drops as a position corresponding to the front face of the forward end portion of the seal lip.

(D) An oil seal recited in the above (A), wherein a guidance groove, a guidance protrusion or a dam is formed on the liquid collecting projection to induce the location where the liquid drops to a location corresponding to the front face of the forward end portion of the seal lip.

(E) An oil seal recited in the above (A), wherein a liquid receiving projection is formed on the seal lip to receive the liquid dropped from the liquid collecting projections and to guide the liquid to the front face of the forward end portion of the seal lip.

Embodiments

Next, the embodiments of the present invention will be described with reference to the drawings.

First Embodiment

Figure 1:
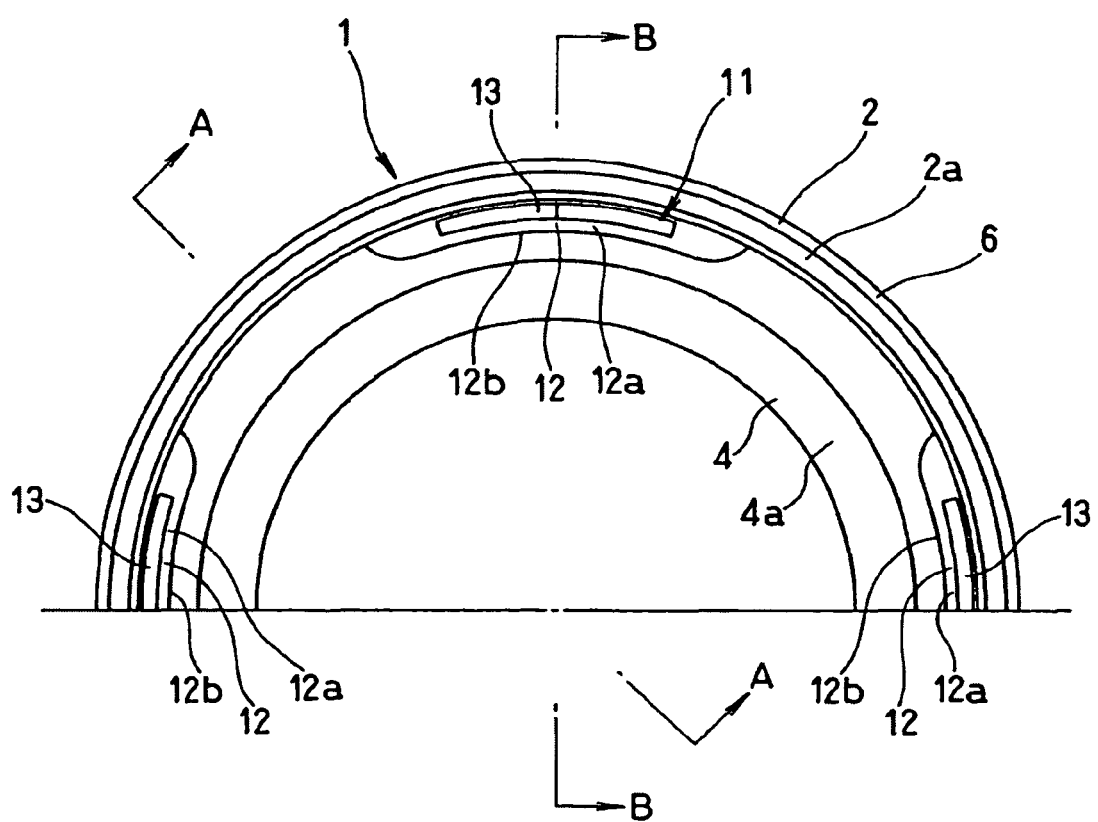
FIG. 1 is a front view showing a half of an oil seal according to a first embodiment of the present invention.
Figure 2:
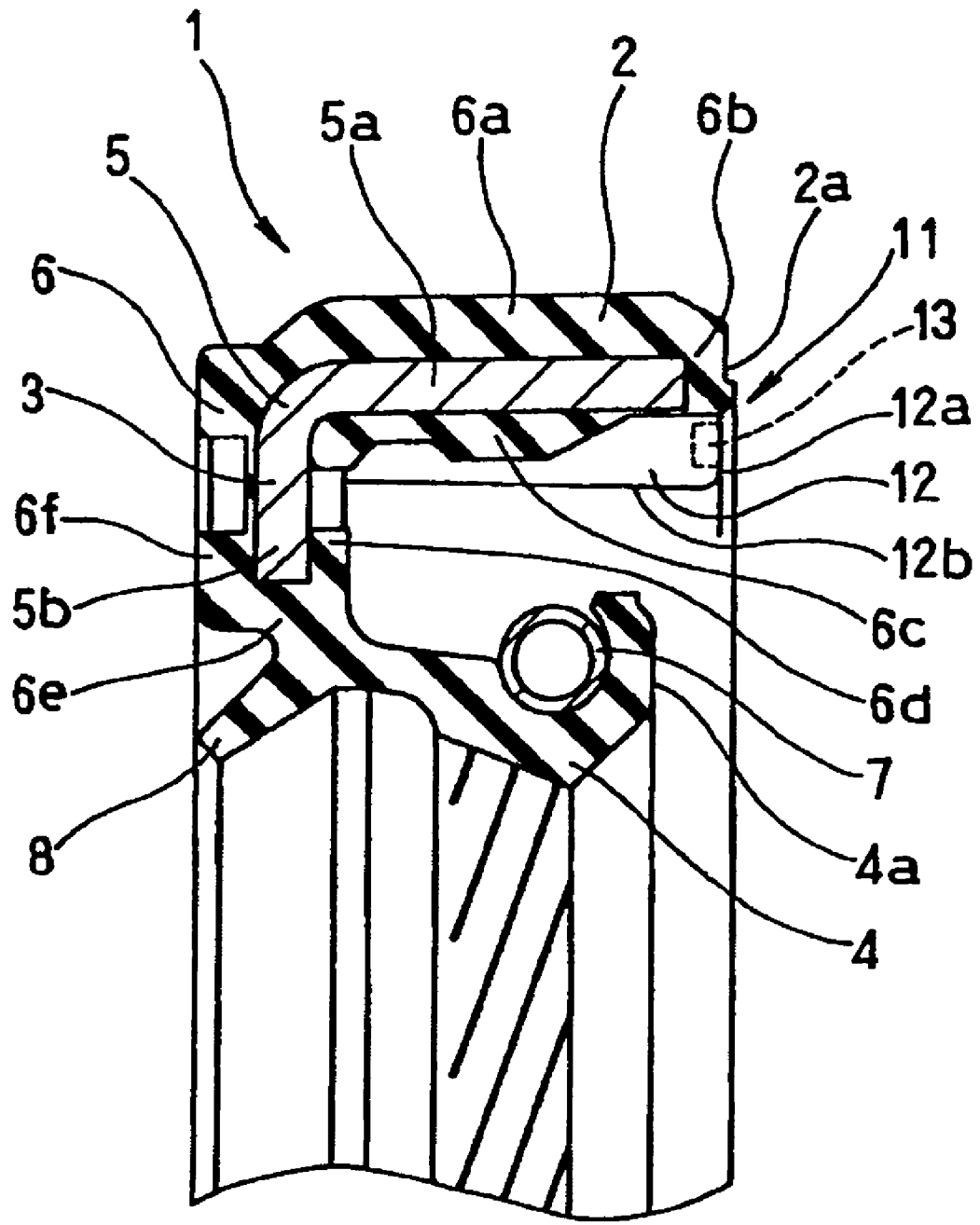
FIG. 2 is an enlarged sectional view showing a main part of the oil seal, taken along the line A-A of FIG. 1.
Figure 3:
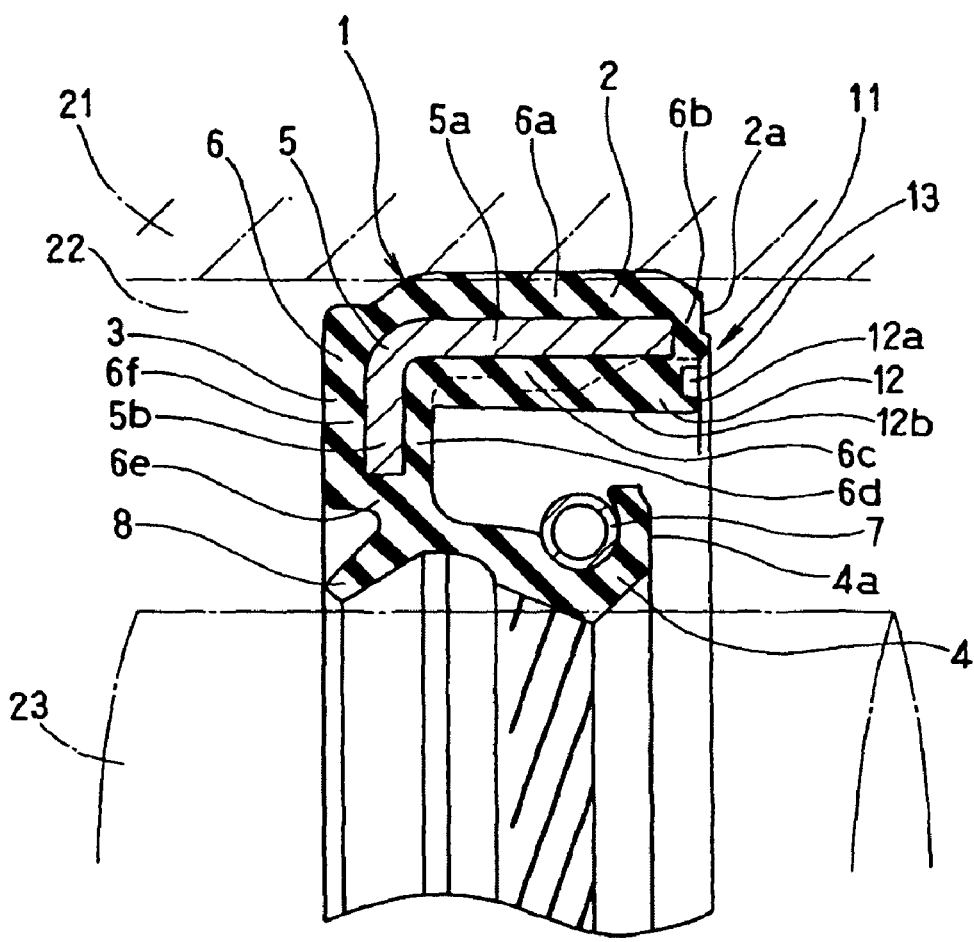
FIG. 3 is an enlarged sectional view showing a main part of the oil seal, taken along the line B-B of FIG. 1.
Figure 4:
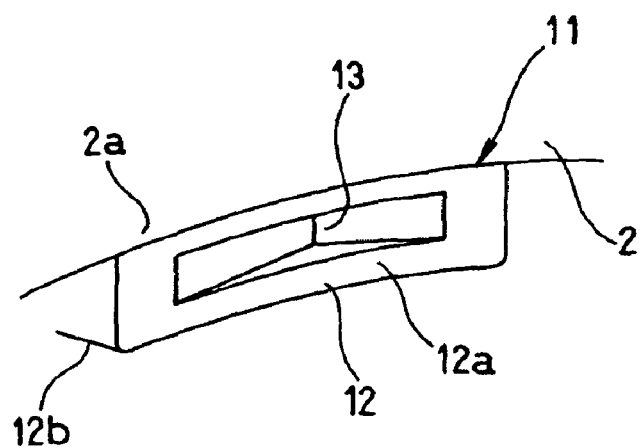
FIG. 4 is a perspective view of a lubricant oil supply section of the oil seal shown in FIG. 1.

FIG. 1 is a front view showing a half of an oil seal 1 according to the first embodiment of the present invention, seen in one axial direction, and the sectional view taken along the line A-A of FIG. 1 is shown in FIG. 2, and the sectional view taken along the line B-B of FIG. 1 is shown in FIG. 3. FIG. 4 is a perspective view of the lubricant oil supply section 11.

The oil seal 1 according to the first embodiment comprises an annular installation section 2 adapted to be fitted to a housing 21 (FIG. 3), and a seal lip 4 provided slidably in close contact with a peripheral surface of a shaft 23 (rotating shaft) (FIG. 3) which is inserted into the inner periphery of the shaft hole 22 formed in the housing 21, and a lubricant oil supply section 11 is provided at a forward end region of the installation section 2 to collect oil adhered thereon and to make the oil to drop on the shaft 23. The lubricant oil supply section 11 may be configured to collect the oil adhered thereon and to supply the oil to the sliding portion between the shaft 23 and seal lip 4. The lubricant oil supply section 11 is formed by a plurality of projections 12 provided circumferentially on the inner peripheral surface of the installation section 2 so that the oil is adhered and collected on the surface of each projection 12. Further, a recess 13 is formed on the surface of each projection 12 to temporally accumulate the oil adhered on the surface thereof, and an inclined face (inner peripheral surface 12b of the projection 12) is provided on the surface of each projection 12 to collect the adhered oil.

The particulars of each part or component are configured as follows.

An annular installation section 2 is provided for mounting the oil seal 1 on the inner peripheral surface of the shaft hole 22 of the housing 21, and an annular seal lip 4 is provided at the inner side of the installation section 2 through the annular connecting portion 3 (seal lip retaining portion). The seal lip 4 is provided slidably and in closely contact with the peripheral surface of the shaft 23. The installation section 2 is provided toward one side in a axial direction (rightward direction in FIG. 3, i.e. the inner side of an engine), viewed from the connecting portion 3, and the seal lip 4 is also provided toward the same side in the axial direction. The oil seal 1 has, as constituent parts thereof, a metal ring 5, a rubber-like elastic body 6 covering the metal ring 5, and a garter spring 7 fitted to the seal lip 4 forming a part of the rubber-like elastic body 6.

The metal ring 5 has a tubular portion 5a fitted on the inner periphery of the shaft hole 22 of the housing 21, and a flange portion 5b formed integrally with the tubular portion 5a. The flange portion 5b is formed extending radially inward from the end at the other side in the axial direction (leftward direction in FIG. 3, i.e. outer side of the engine) of the tubular portion 5a. The rubber-like elastic body 6 has an integral structure of an outer peripheral face cover portion 6a (outer peripheral seal portion) covering the outer peripheral surface of the tubular portion 5a of the metal ring 5 to seal between the metal ring 5 and the housing 21, a forward end face cover portion 6b covering the forward end face of the tubular portion 5a, an inner peripheral face cover portion 6c covering the inner peripheral surface of the tubular portion 5a, an inside end face cover portion 6d covering one end face at one side in the axial direction of the flange portion 5b (inside end face), an inner peripheral end cover portion 6e covering the inner peripheral end of the flange portion 5b, and an outside end face cover portion 6f covering the end face at the other side in the axial direction of the flange portion 5b (outside end face), and the seal lip 4 and a sub-lip 8 are formed integrally with the elastic body 6.

Further, the oil seal 1 has, in particular, a lubricant oil supply section 11 provided on the axially forward end portion of the installation section 2 at the inner peripheral side thereof to collect the oil adhered on the lubricant oil supply section 11 and make the oil drop on the peripheral surface of the shaft 23.

The lubricant oil supply section 11 comprises a plurality of projections 12 provided on the inner peripheral surface of the installation section 2. Each projection 12 is configured such that misty oil is adhered on the surface, particularly on the axially forward end face 12a of the projection 12, and the adhered oil is collected, and the collected oil is dropped as drops of oil by gravitation from the projection 12 disposed above the shaft 23 to the peripheral surface of the shaft 23.

A plurality of the projections 12 are circumferentially provided so as to be equally spaced (four projections in this embodiment as shown in FIG. 1), with a circumferential interval set between the adjacent projections. Although the figure shows four projections with equal interval, the number of projections is not limited to four. It is preferable that four to sixteen projections may be arranged with a circumferentially equal interval. The projections 12 are formed as a part of the rubber-like elastic body 6, are formed integrally with the forward end face cover portion 6b and the inner peripheral surface of the inner peripheral face cover portion 6c. The projections 12 are protruded radially inward, and formed in a rib-like and axially elongated shape.

Each of the projections 12 has a recess 13 formed on the axially forward end face 12a thereof to temporally accumulate the adhered oil, and has an inclined face formed on the inner peripheral surface 12b of the projection 12 to collect the adhered oil. The latter inclined face is formed such that the oil adhered on the inner peripheral surface 12b of the projection 12 located above the shaft 23 as well as the oil flowing to the inner peripheral surface 12b are collected to the inner peripheral edge of the forward end face 12a, and the downward inclined face is provided toward the inner peripheral edge of the forward end face 12a (undercut-shape conical inclined face). With such structure, the oil flows down along this inclined face and is collected to the inner peripheral edge of the forward end face 12a, and the collected oil is merged with the oil flowing from the forward end face 12a, and then drop on the shaft 23. The axially forward end of the lubricant oil supply section 11, i.e. axially forward end face 12a of the projection 12 is projected in one axial direction than the axially forward end face 4a of the seal lip 4 so that the oil can drop directly on the periphery of the shaft 23 instead of on the seal lip 4.

The oil seal 1 configured as above is fitted between the housing 21 and the shaft 23 as shown in FIG. 3 to seal the oil inside the device, and with such structure the following effects are achieved.

According to the oil seal 1 having the structure as mentioned above, the lubricant oil supply section 11 is provided on the forward end region of the installation section 2 to collect the oil adhered thereon and to make the oil to drop on of the peripheral surface of the shaft 23, thereby the sliding portion of the seal lip 4 can be lubricated by the dropped oil. Therefore, the lubricant oil supplying performance to the sliding portion of the seal lip 4 can be enhanced, thereby improving durability of the seal lip 4.

Furthermore, since the projections 12 and the recesses 13 are provided on the lubricant oil supply section 11, it becomes possible to collect larger amount of the oil on the projections 12 and to temporarily accumulate the oil in the recesses 13. Therefore, the oil can be collected as much as possible and dropped on the peripheral surface of the shaft 23.

Further, since a plurality of the projections 12 are formed circumferentially on the oil seal and the recess 13 is formed on each projection 12, it can be prevented that the trapped oil flows away in the circumferential direction along the surface of the projection 12 and the recess 13 which might be caused in the case of the projection 12 and the recess 13 being formed in annular shape over the entire circumference of the oil seal 1, thereby the oil can be collected as much as possible and can be dropped on the peripheral surface of the shaft 23.

Further, since a plurality of the projections 12 are circumferentially provided so as to be equally spaced, any of the projections 12 may be positioned exactly above the shaft 23, thereby to ensure dropping of the oil onto the peripheral surface of the shaft 23 without fail. Accordingly, since circumferential directionality is not required for mounting the oil seal 1, workability of mounting the oil seal 1 is not decreased, even if the projections 12 are circumferentially spaced. (In the case that only one projection 12 is circumferentially provided, circumferential directionality is restrained so that the projection 12 can be positioned above the shaft 23 when the oil seal 1 is mounted. In contrast to such case, according to the present invention, since a plurality of the projections 12 are circumferentially provided so as to be equally spaced, any of the projections 12 may be located above the shaft 23 without taking mounting direction into consideration. To achieve sufficient effect, it is preferable that at least four projections 12 are circumferentially provided so as to be equally spaced.)

By the way, the perspective view of FIG. 4 shows one example of the shape of recess 13. In FIG. 4, the recess 13 is formed in an elongated groove shape extending circumferentially. The groove-shaped recess 13 is formed so as to be deepest at the middle in the circumferential direction and become shallow gradually toward both ends in the circumferential direction. However, such shape is only an example, and not limited to this shape. For example, the recess 13 may have shapes shown below.

Second Embodiment

Figure 5:
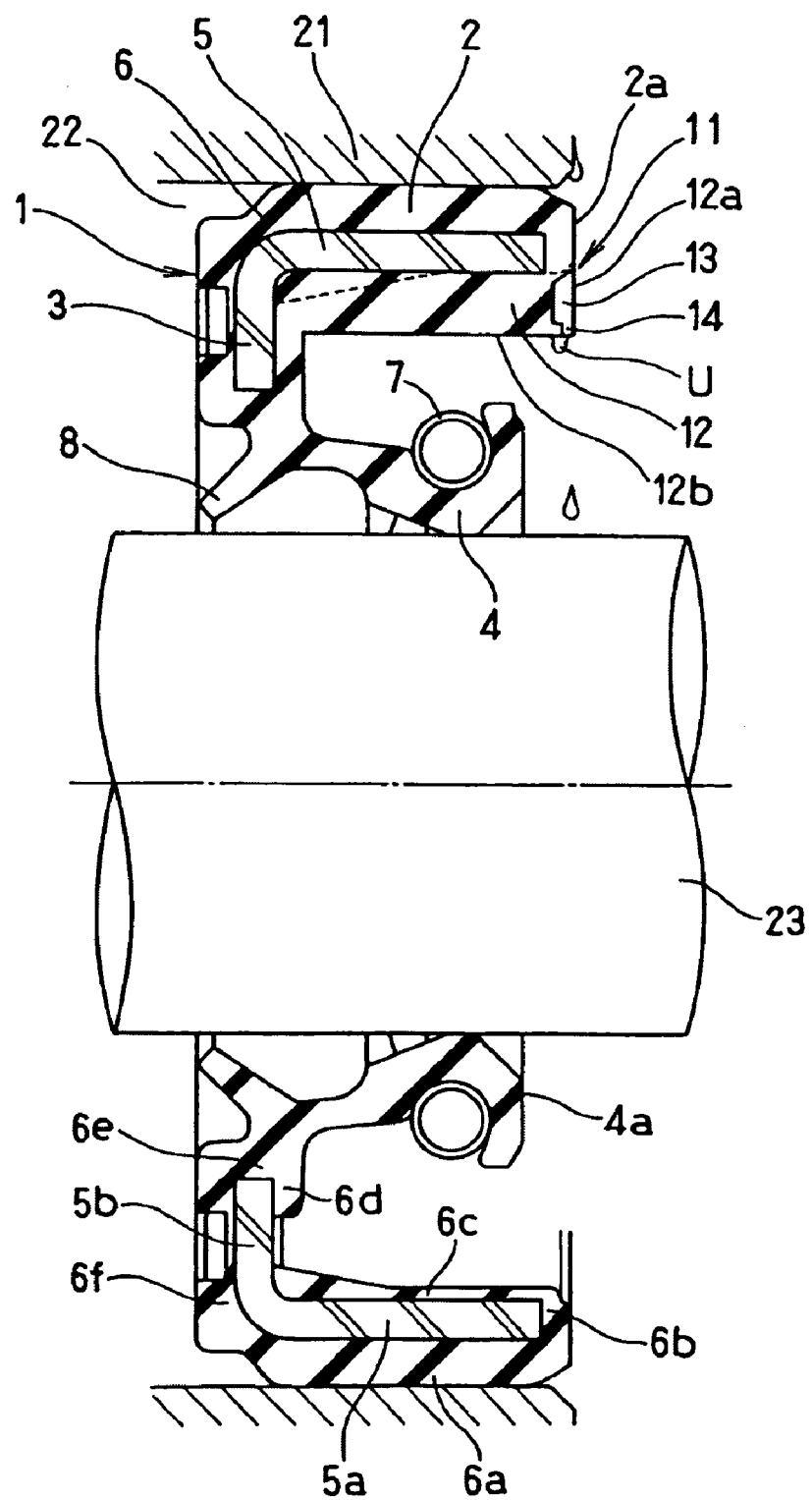
FIG. 5 is a sectional view of an oil seal according to a second embodiment of the present invention.
Figure 6:
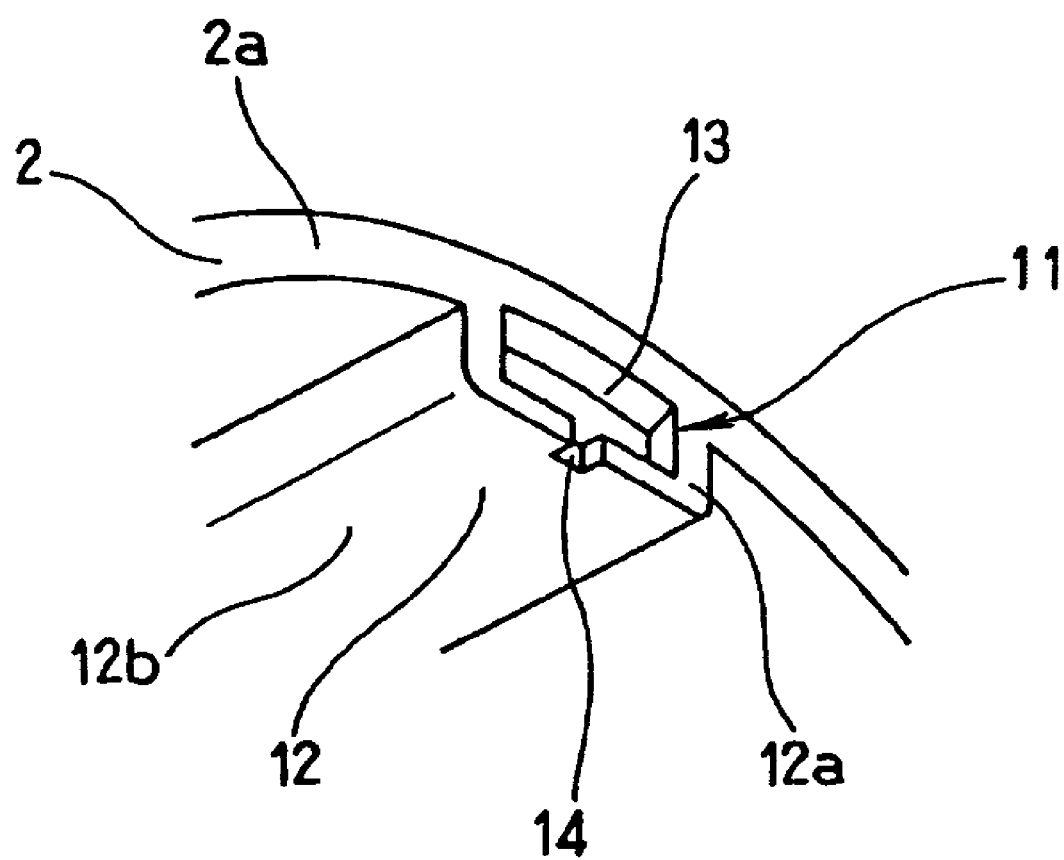
FIG. 6 is a perspective view of a lubricant oil supply section of the oil seal shown in FIG. 5.

As shown in FIGS. 5 and 6, a groove-shaped recess 13 is provided on the forward end face 12a of the projection 12, and in addition to this recess, a cut-shaped spout 14 for the oil (concave spout) is provided on the forward end face 12a of the projection 12 at the middle in the width direction of the inner peripheral side of the recess 13. With such structure, the oil accumulated in the recess 13 drops onto the shaft 23 through the cut-shaped spout 14. Therefore, according to this embodiment, it is advantageous to be able to control the size of an oil drop U by changing the size of cut-shaped spout 14. Further, according to the embodiment as shown in FIGS. 5 and 6, it is possible to collect the oil as much as possible, since the forward end face 12a of the projection 12 is formed so as to be flush with the forward end face 2a of the installation section 2 without providing a step between them.

Third Embodiment

Figure 7:
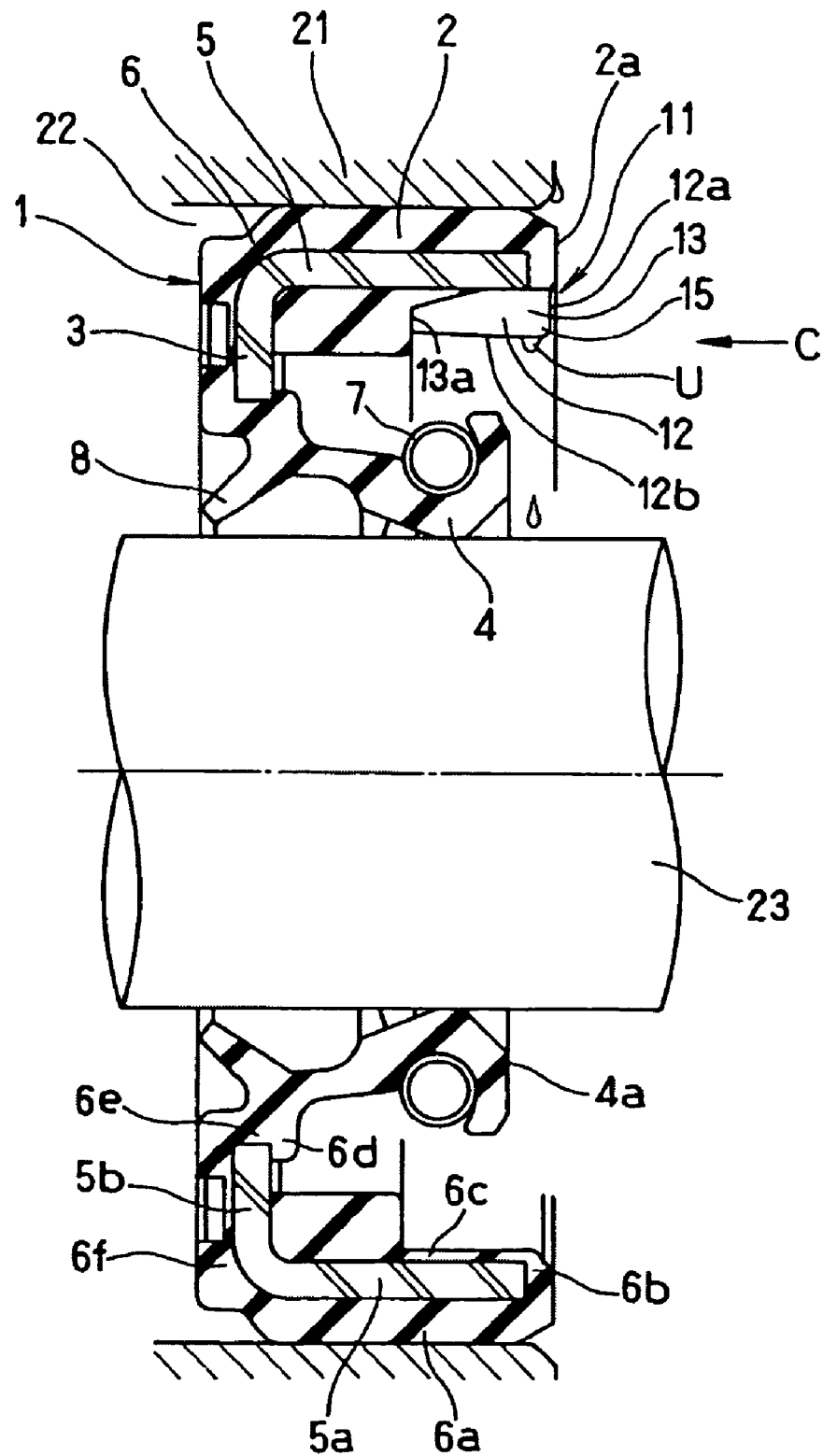
FIG. 7 is a sectional view of an oil seal according to a third embodiment of the present invention.
Figure 8:
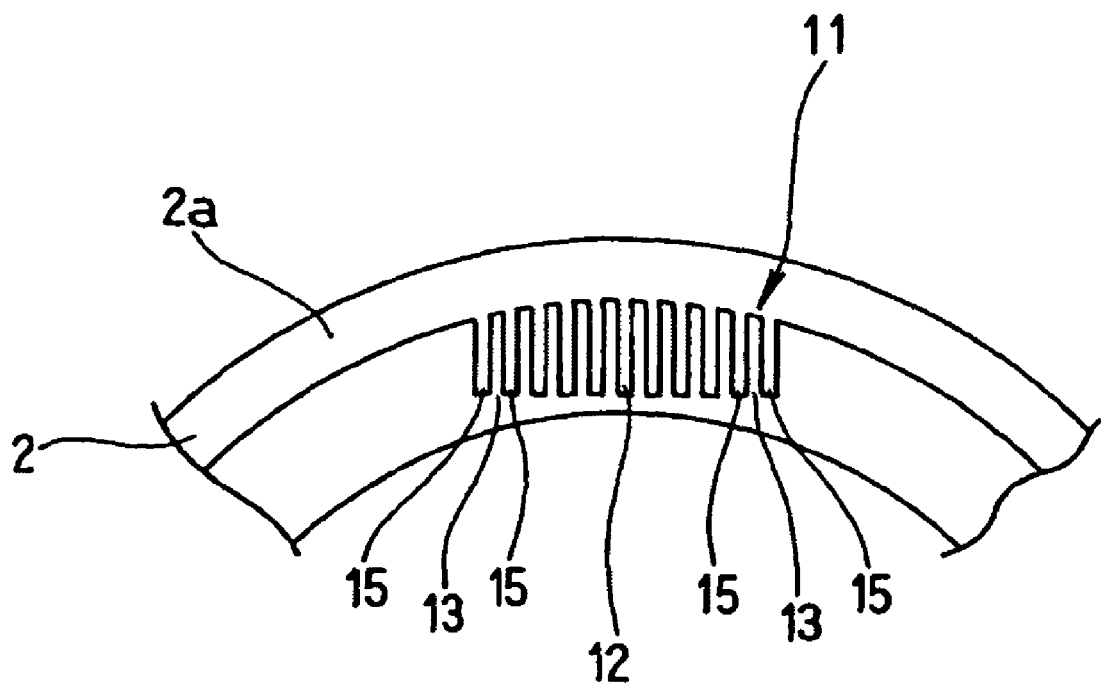
FIG. 8 is a front view of a lubricant oil supply section of the oil seal, seen in the direction of arrow C in FIG. 7.

As shown in FIGS. 7 and 8, the projection 12 is formed by a plurality of fins (thin plate-shaped projections) 15 (eleven fins are shown in the figures) in parallel and gaps (gap spaces) between the adjacent fins 15 are used for the recesses 13 for accumulating the oil. In this case, the gaps between the respective fins 15, i.e. the recesses 13 not only open in the one axial direction but also open radially inward. According to this embodiment, it is advantageous to accumulate the oil as much as possible by capillary action produced depending on the size of the gaps between the adjacent fins 15, i.e. the recesses 13. Further, there is provided a back end wall 13a (axial end wall) at the other axial direction side of the gaps between the adjacent fins 15, i.e. the recess 13 to block the oil flowing in this direction. Further, in the embodiment as shown in FIGS. 7 and 8, there is provided an inclined face on the projection 12, i.e. on the inner peripheral surface 12b of each fin 15 to collect the adhered oil, like the first embodiment, thereby to accumulate the oil as much as possible.

In the case that the lubrication oil supplying section 11 is configured to have a plurality of the fins 15 like the above-mentioned embodiment, the oil adhered to the fins 15 and accumulated in the gaps among the fins 15, i.e. the recesses 13 hardly flows in the circumferential direction of the oil seal 1 (hardly flows from one fin 15 to the adjacent fin 15 or from one recess 13 to the adjacent recess 13). Therefore, the fins 15 may be provided along the entire circumference of the oil seal 1, and in such case, the fins 15 are formed to extend radially and spaced at predetermined intervals (pitch) over the entire circumference of the oil seal 1.

Further, in addition to the first to third embodiments, the following structure may be effective for the projection 12 to collect the oil on its surface as much as possible and make it easily drop.

Fourth Embodiment

Figure 9:
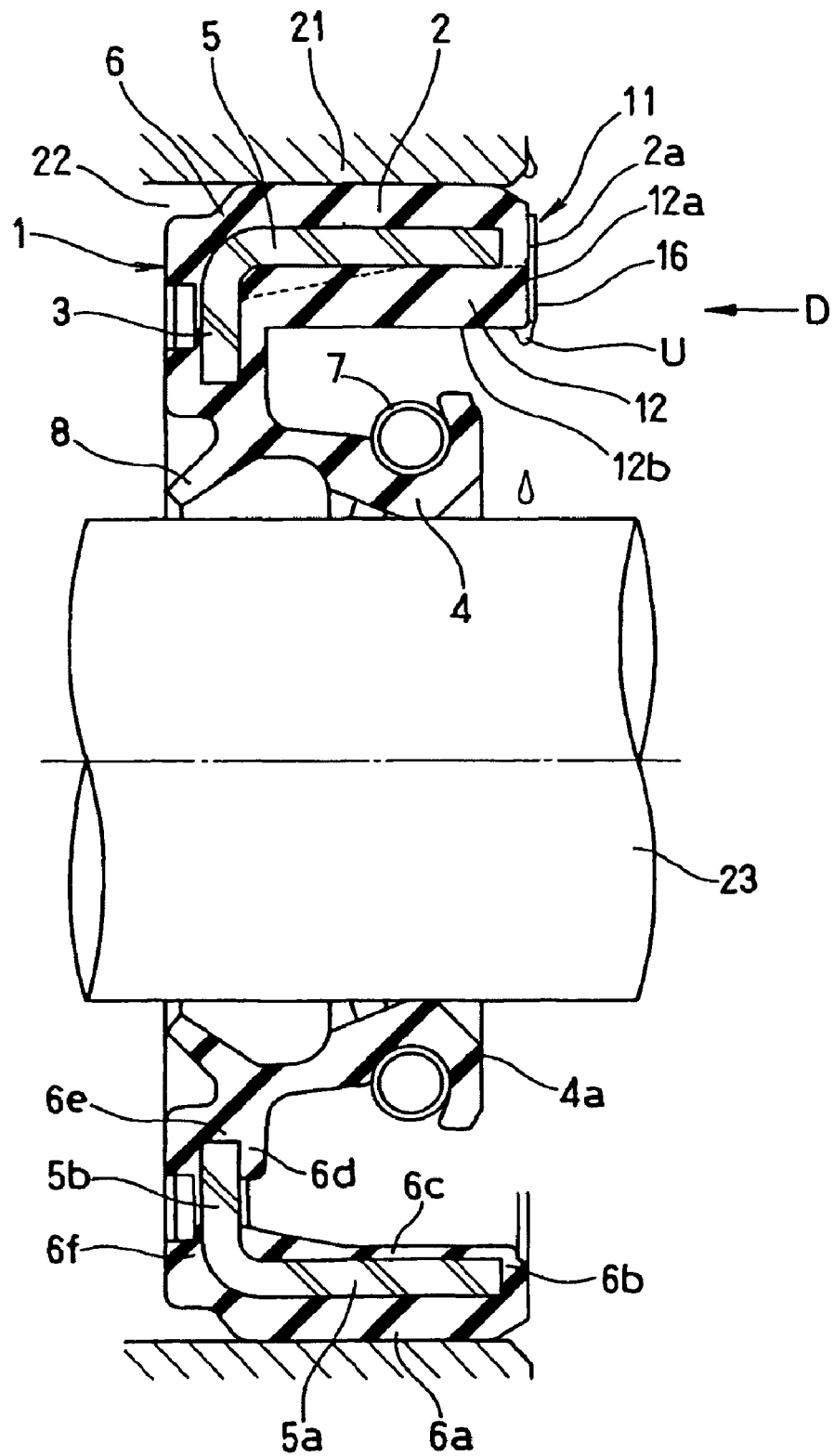
FIG. 9 is a sectional view of an oil seal according to a fourth embodiment of the present invention.
Figure 10:
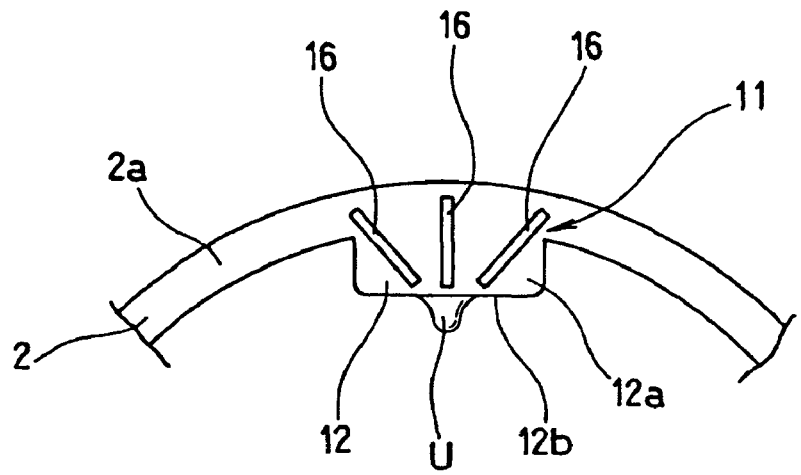
FIG. 10 is a front view of a lubricant oil supply section of the oil seal, seen in the direction of arrow D in FIG. 9.

As shown in FIGS. 9 and 10, there are provided guidance projections 16 on the forward end face 12a of the projection 12 to collect the oil. In this embodiment, a plurality of the rib-like guidance projections 16 (three projections shown in FIG. 10) are provided on the forward end face 12a of the projection 12 with the distance between the adjacent guidance projections 16 being reduced gradually toward radial inward. Therefore, according to such structure, the oil adhered on the forward end face 12a of the projection 12 flows along the guidance projections 16 and is gradually converged, thereby to collect the oil as much as possible. Further, in the embodiment shown in FIGS. 9 and 10, the inner peripheral edge of the forward end face 12a of the projection 12 is not formed in a circular arc shape, but formed in a straight line shape connecting both ends thereof, and the forward end face 12a of the projection 12 is formed to be flushed with the forward end face 2a of the installation section 2 without providing a steps between them, and further, the outer peripheral end of each guidance projection 16 extends beyond the forward end face 12a of the projection 12 and reaches the forward end face 2a of the installation section 2 (the outer peripheral end of the guidance projection 16 constitutes a dam as recited in the ninth aspect), thereby to collect the oil as much as possible.

Fifth Embodiment

Figure 11:
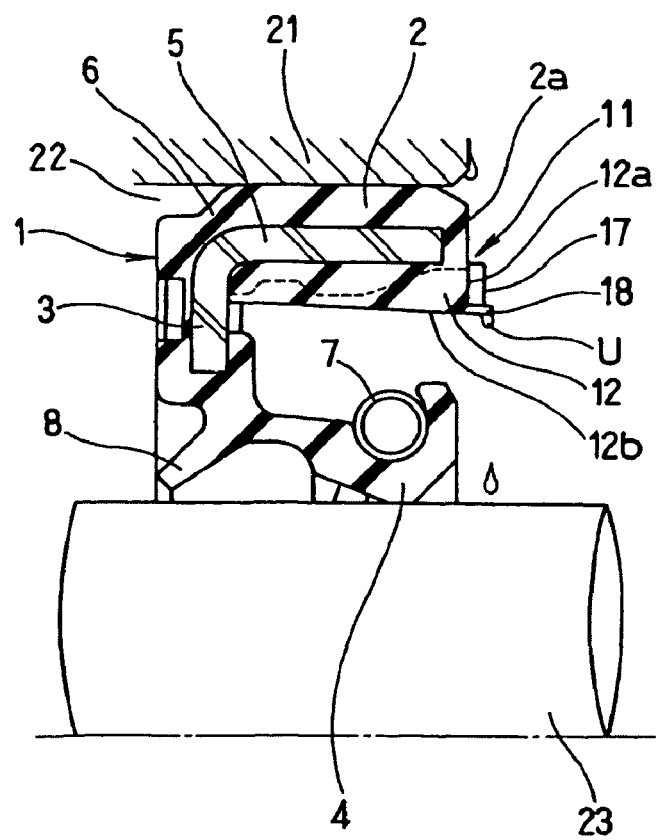
FIG. 11 is a sectional view showing a half of an oil seal according to a fifth embodiment of the present invention.
Figure 12:
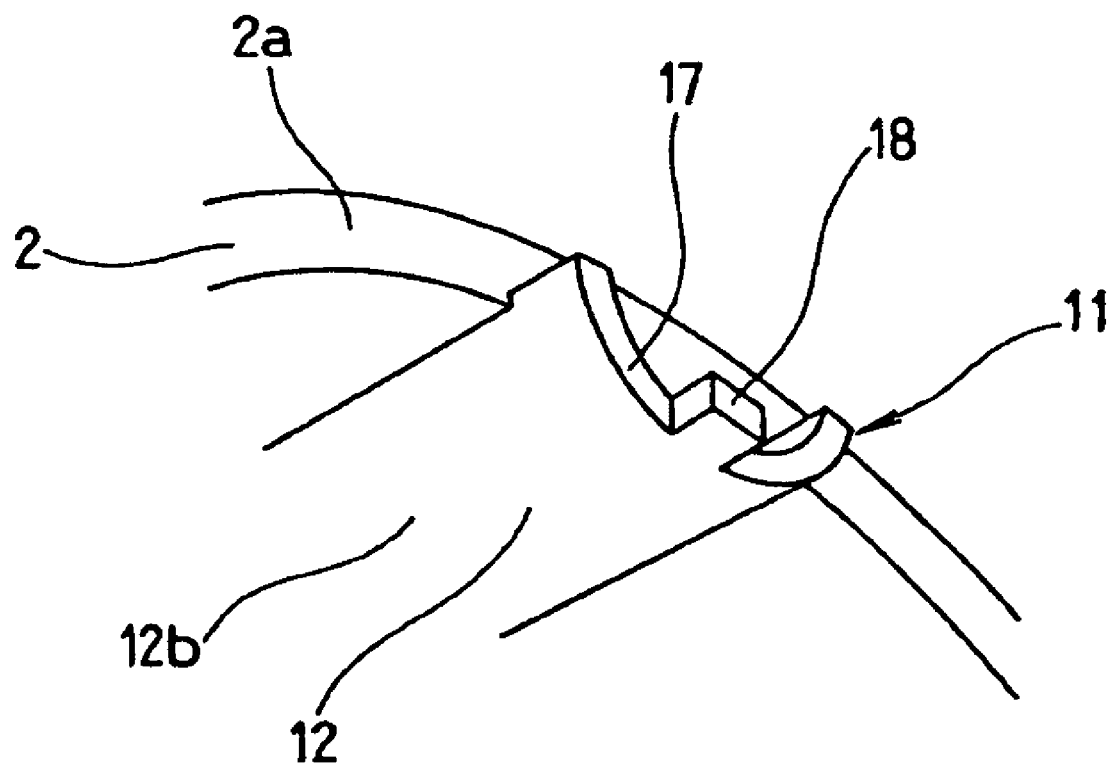
FIG. 12 is a perspective view of a lubricant oil supply section of the oil seal shown in FIG. 11.

As shown in FIGS. 11 and 12, there are provided guidance projections 17 and 18 on the forward end face 12a of the projection 12 to collect the oil. In this embodiment, the guidance projection 17 (first stage guidance projection) is provided along the inner peripheral edge of the forward end face 12a of the projection 12 so as to protrude in one axial direction, and the guidance projection 18 (second stage guidance projection: convex spout) having relatively narrow width is provided at the middle in width direction of the guidance projection 17 so as to protrude in the same one axial direction. Therefore, by the provision of the axially two staged guidance projections 17 and 18, the oil can be collected step by step. Since the projection 12 is formed having an approximately semi-circular shaped section when viewed in one axial direction (a semi-circular shape convexed to protrude radially inward), the first stage guidance projection 17 provided along the inner peripheral edge of the forward end face 12a is formed having an approximately semi-circular arc shaped section, and the second stage guidance projection 18 is provided on the middle of the circular arc of the first stage guidance projection 17. The oil can easily be accumulated with the circular arc configuration of the respective projections. Furthermore, in the embodiment shown in FIGS. 11 and 12, an inclined face is formed on the inner peripheral surface 12b of the projection 12 to collect the adhered oil like the first embodiment, and the forward end face 12a of the projection 12 is formed to be flush with the forward end face 2a of the installation section 2 without having a step portion between those faces, and the right and left outer peripheral ends of the guidance projection 17 having circular arc shaped section extend beyond the forward end face 12a of the projection 12 and reach the forward end face 2a of the installation section 2 (the right and left outer peripheral ends of the guidance projection 17 constitute a dam as recited in the ninth aspect), thereby to collect the oil as much as possible.

Sixth Embodiment

Figure 13:
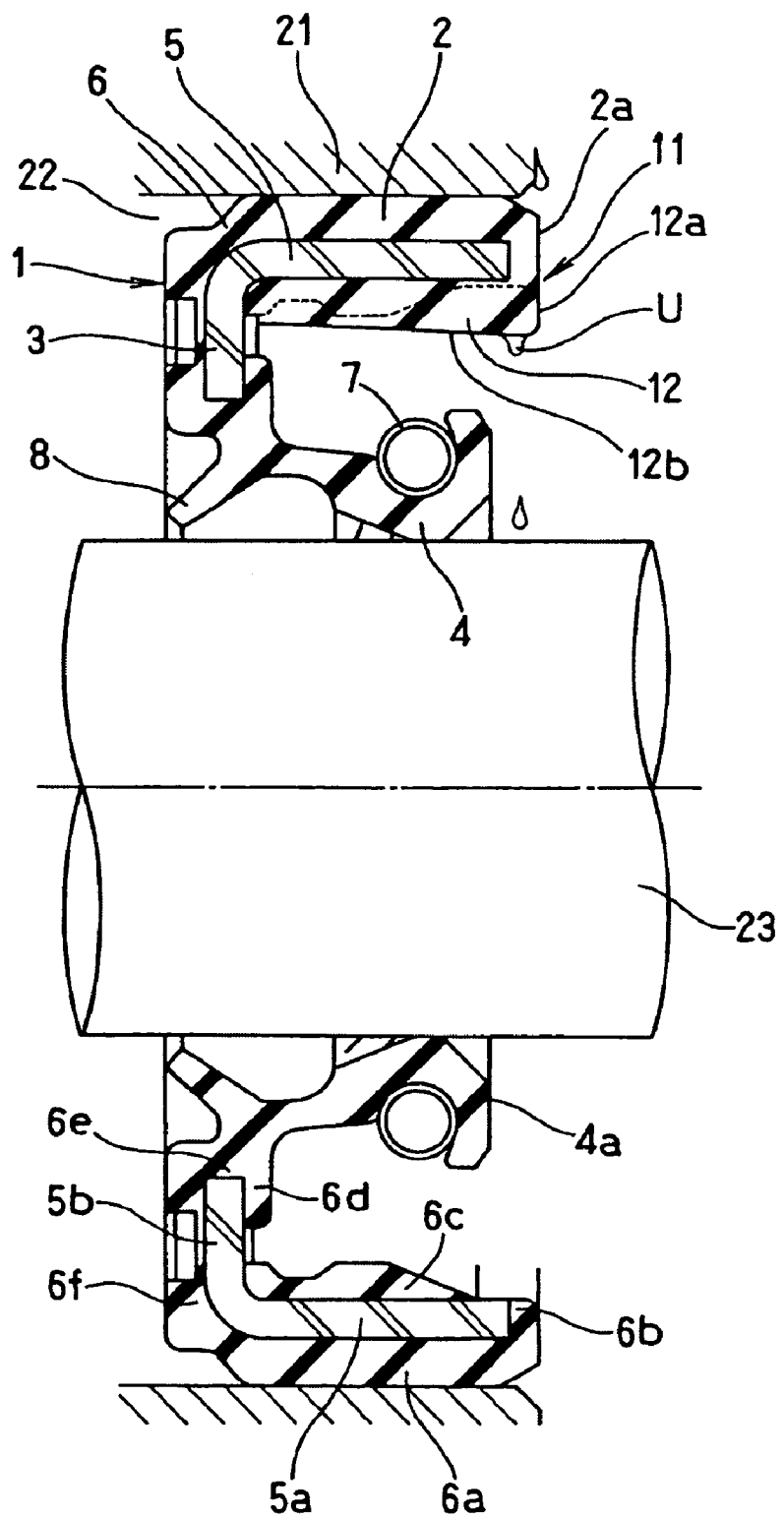
FIG. 13 is a sectional view of an oil seal according to a sixth embodiment of the present invention.
Figure 14:
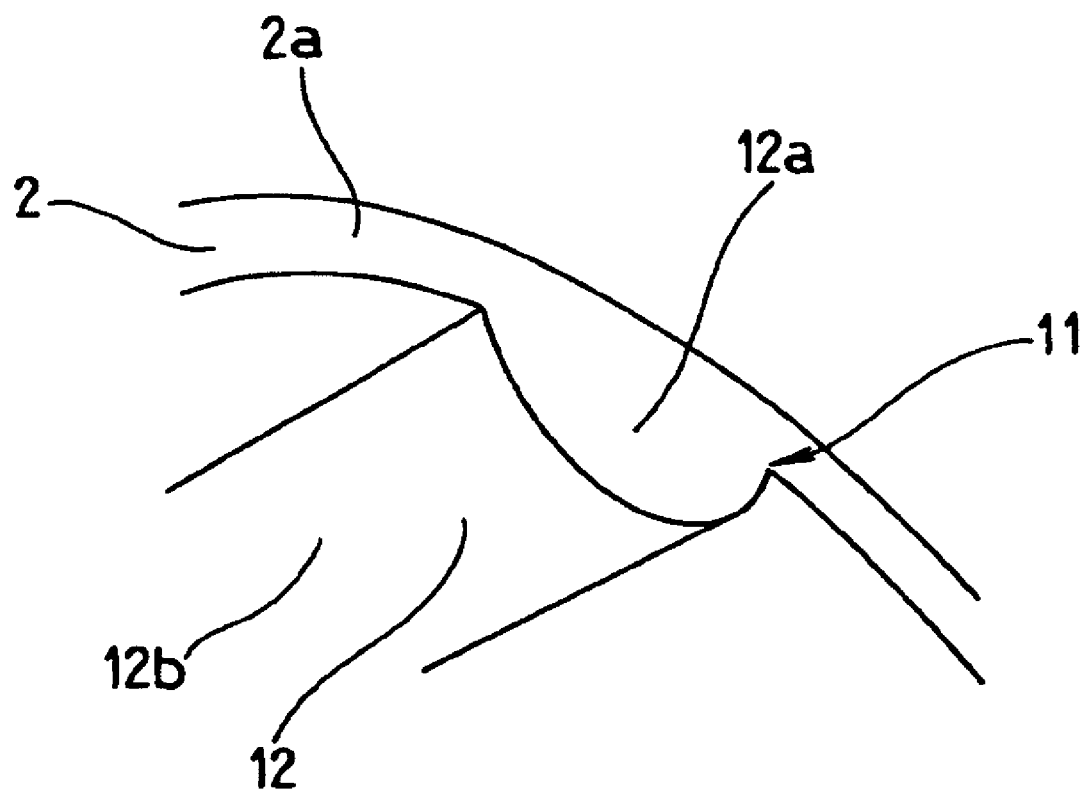
FIG. 14 is a perspective view of a lubricant oil supply section of the oil seal shown in FIG. 13.

As shown in FIGS. 13 and 14, an inclined face is formed on the inner peripheral surface 12b of the projection 12 to collect the oil, and the forward end face 12a of the projection 12 is formed to be flush with the forward end face 2a of the installation section 2 without having a step portion between those faces. These configurations and operations, which have been already explained in detail, are effective to collect the oil as much as possible. It is preferable that the projection 12 is formed to have an axial length as long as possible so that the oil can be collected as much as possible.

Seventh Embodiment

Figure 15:
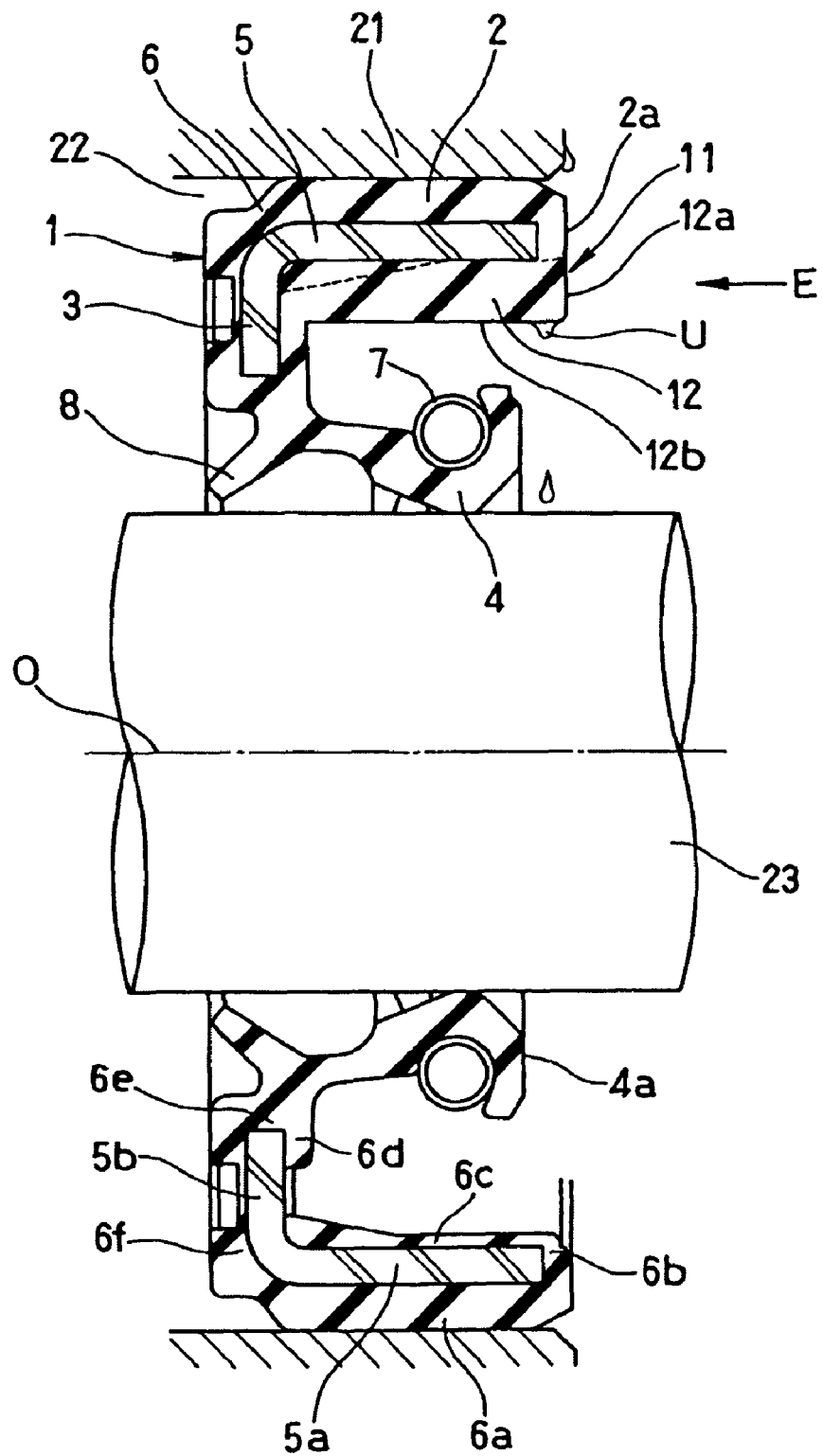
FIG. 15 is a sectional view of an oil seal according to a seventh embodiment of the present invention.
Figure 16A:
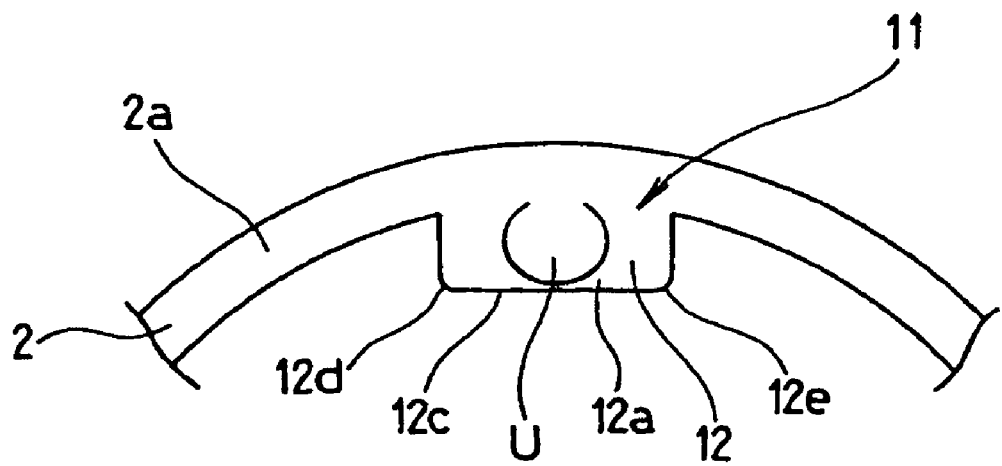
FIG. 16(A) is a front view of a lubricant oil supply section of the oil seal shown in FIG. 15, seen in the direction of arrow E in FIG. 15.
Figure 16B:
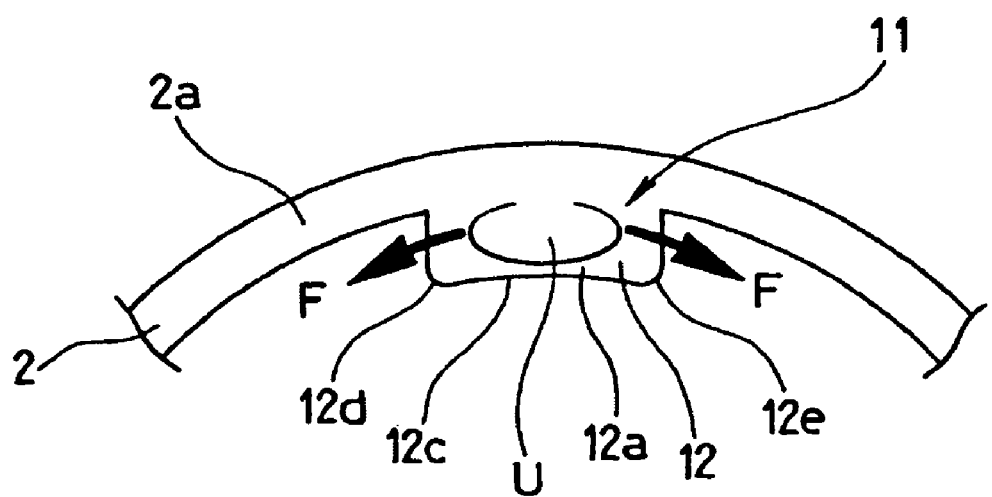
FIG. 16(B) is a front view of a lubricant oil supply section according to a comparative example.

As shown in FIGS. 15 and 16(A), an inner peripheral edge 12c of the forward end face 12a of the projection 12 is formed in a straight shape instead of a circular arc shape. Namely, the inner peripheral edge 12c of the forward end face 12a of the projection 12 is not formed in a circular arc shape concentric with the oil seal 1 around a center axis O like as a comparative example shown in FIG. 16(B), but formed in a straight shape connecting straightly the both ends 12d and 12e of the circular arc as shown in FIG. 16(A). According to this embodiment, the surface area of the forward end face 12a of the projection 12 can be formed to be larger than the comparative example, thereby retention of the oil drop U can be improved and the oil can be collected as much as possible. In case of the comparative example as shown in FIG. 16(B) where the inner peripheral edge 12c of the forward end face 12a of the projection 12 is formed in a circular arc shape, force F that makes the oil drop U flow along the circular arc in right and left directions (circumferential directions) is possibly produced, however, when the inner peripheral edge 12c is formed in a straight shape, such force F cannot be produced, thereby to enhance the possibility of dropping of the oil.

Eighth Embodiment

Figure 17:
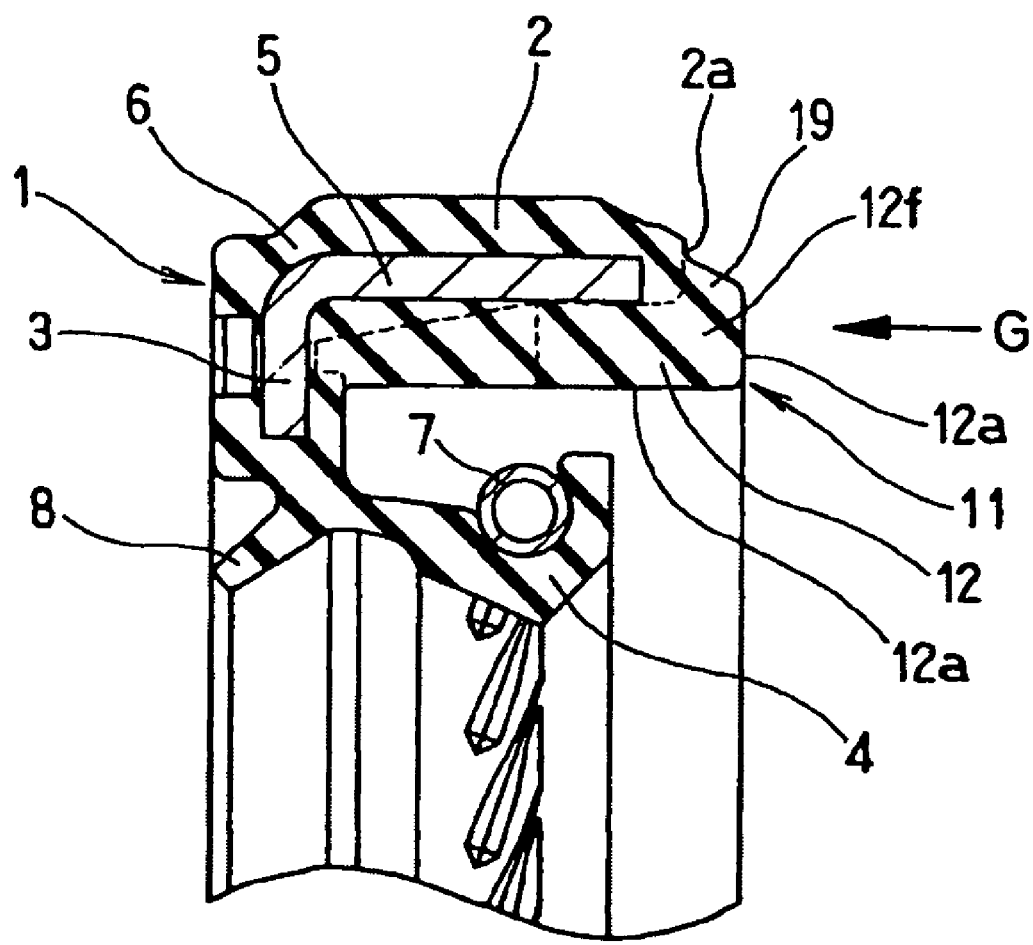
FIG. 17 is a sectional view showing a main part of an oil seal according to an eighth embodiment of the present invention.
Figure 18A:
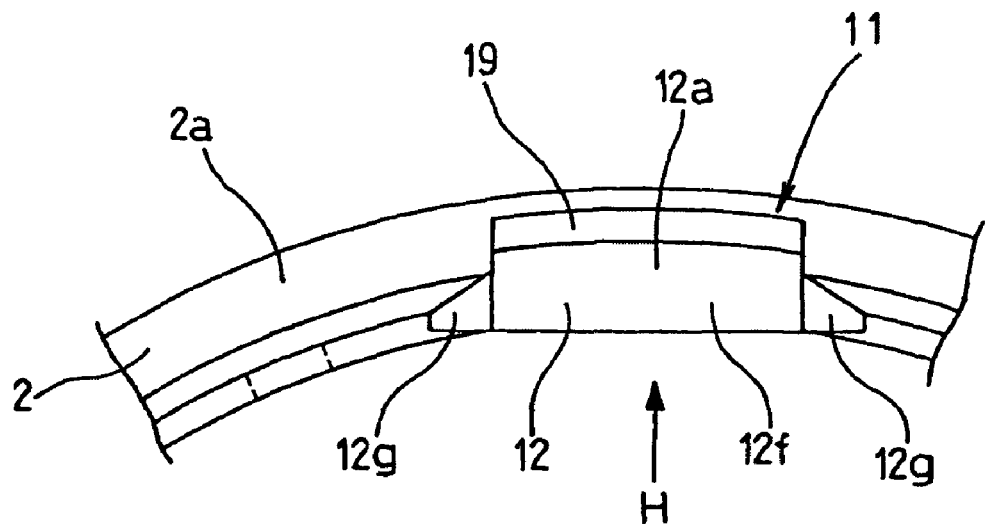
FIG. 18(A) is a front view of a lubricant oil supply section of the oil seal shown in FIG. 17, seen in the direction of arrow G in FIG. 17.
Figure 18B:
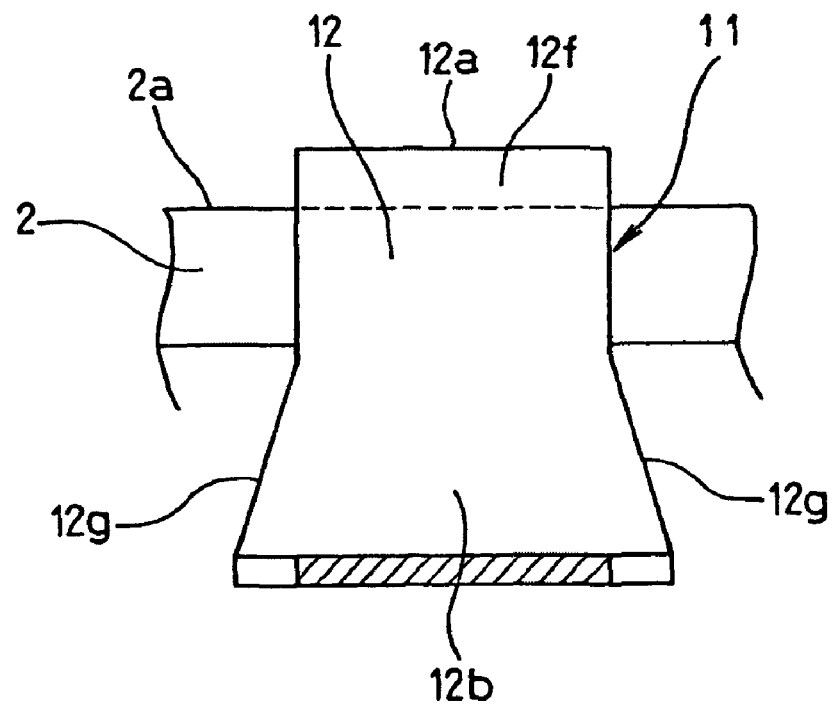
FIG. 18(B) is a view showing the lubricant oil supply section, seen in the direction of arrow H in FIG. 18(A), FIGS. 19(A) and 19(B) are drawings for explaining the operation of the lubricant oil supply section shown in FIGS. 18(A) and 18(B)

As shown in FIGS. 17 and 18, a dam 19 is provided on the forward end face 2a of the installation section 2 to block the oil flowing circumferentially along the forward end face 2a of the installation section 2 and to guide the oil flow toward the projection 12.

That is to say, since the projection 12 is disposed below the installation section 2 at a position above (just above) the shaft 23, the oil adhered on the forward end face 2a of the installation section 2 relatively easily flows toward the projection 12. However, since the projection 12 is disposed at the side or near the side of the installation section 2, instead of being disposed below the installation section 2, at another position than the position of being above (just above) the shaft 23, there is a problem that the oil adhered on the forward end face 2a of the installation section 2 flows circumferentially along the forward end face 2a. Then, by providing the dam 19 on the flow route to block the flowing of oil, the oil flows easily from the installation section 2 toward the projection 12, thereby the oil can be collected as much as possible. For this reason, according to the above-mentioned embodiment, the dam 19 is provided on the forward end face 2a of the installation section 2 for each projection 12. As shown in the figures, the dam 19 is formed integrally with an axially protruded portion 12f of the projection 12 so that the forward end faces of the both are on the same level. Therefore, by the provision of such dam 19, the oil circumferentially flowing (indicated with an arrow I) on the forward end face 2a of the installation section 2 is blocked by the dam 19 and guided to the projection 12 as shown in FIG. 19 (indicated with an arrow J), thereby the projection 12 can collect the oil as much as possible. Further, in the embodiment shown in FIGS. 17 and 18, an inclined face is provided on each circumferentially extending side surface 12g of the projection 12 to collect the adhered oil, thereby to collect the oil as much as possible. The oil flows along this inclined face and converged toward the forward end face 12a of the projection 12 (as indicated with an arrow K).

Ninth Embodiment

Figure 20:
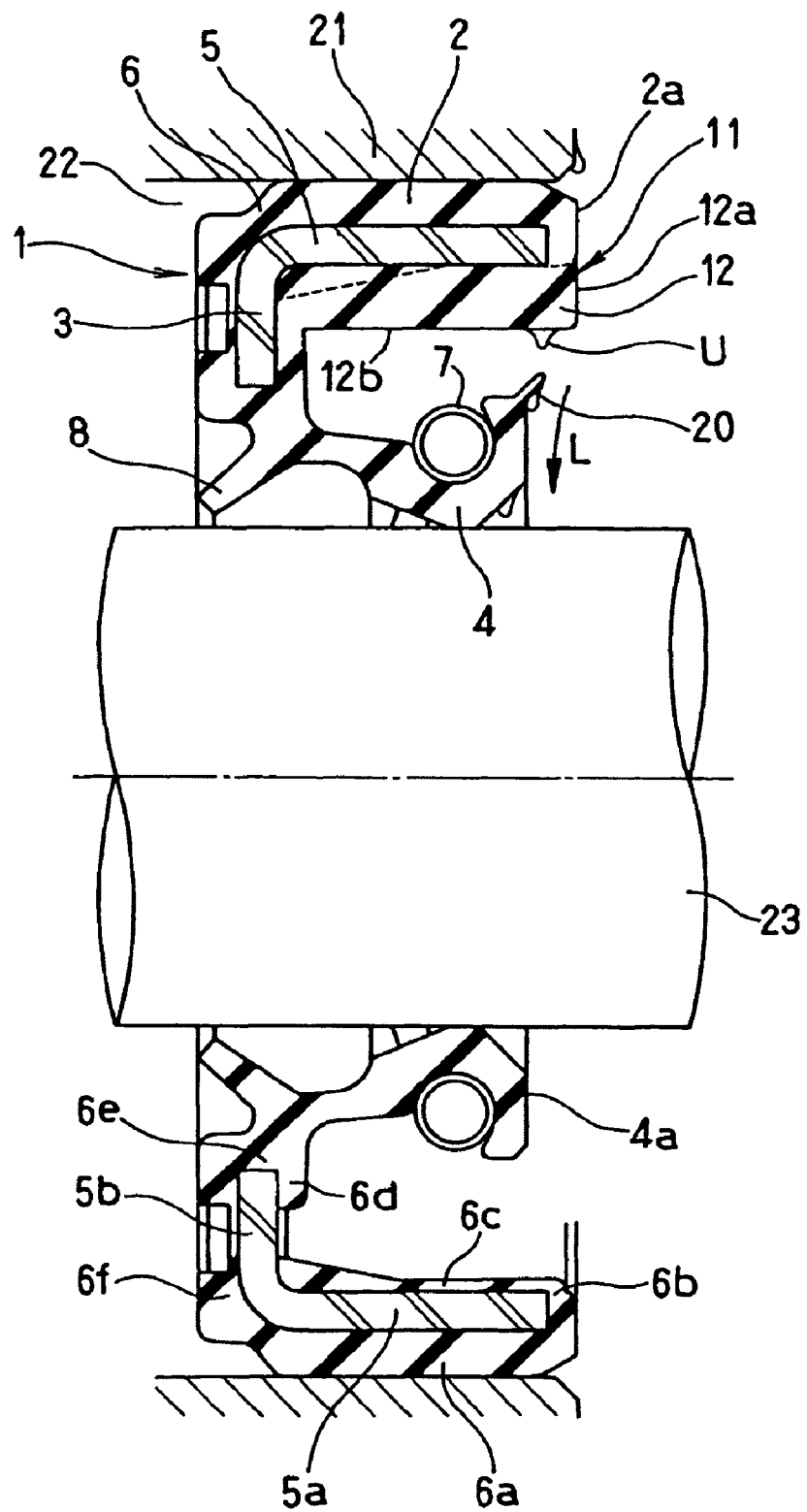
FIG. 20 is a sectional view of an oil seal according to a ninth embodiment of the present invention.

Furthermore, as shown in FIG. 20, as an auxiliary member to assist the lubrication oil supplying function by the projection 12 in the above-mentioned embodiments, an oil receiving piece 20 is formed integrally with the seal lip 4 so as to extend radially outward from the outer periphery thereof so that the oil collected to the projection 12 is guided by the oil receiving piece 20 toward the seal lip 4, and supplied to the sliding portion of the seal lip 4. As the oil receiving piece 20 is formed integrally with the seal lip 4 extending radially outward from the outer periphery thereof, the oil collected to the projection 12 is guided by the oil receiving piece 20 toward the seal lip 4, and supplied to the sliding portion along a forward end face 4a of the seal lip 4, thereby the oil supplying can be done smoothly.

In the figure, the oil receiving piece 20 is provided on the forward end face 4a of the seal lip 4 at its outermost periphery so as to extend radially outward therefrom and to have inclination with respect to the one axial direction. Thus, as the oil-receiving piece 20 is formed in a lip-shape and can be made of a thin film in view of its function, the oil receiving piece 20 can be formed by using a burr formed in the molding process.

The oil receiving piece 20 is disposed at an inner peripheral side of the projection 12 but not in contact with the inner peripheral surface 12b of the projection 12, thereby a radial gap is formed between the projection 12 and oil receiving piece 20. Therefore, the oil dropped from the projection 12 (oil drops) is received by the oil receiving piece 20, flows along the forward end face 4a of the seal lip 4, and then is supplied to the sliding portion of the seal lip 4 (as indicated with an arrow L). Further, when the radial gap between the projection 12 and oil receiving piece 20 is narrow or when the size of oil drop is large, the oil is often transferred directly from the projection 12 to the oil receiving piece 20 before dropping from the projection 12, and also in this case, the oil flows along the forward end face 4a of the seal lip 4 and is supplied to the sliding portion of the seal lip 4. Therefore, in any case, oil supply routes starting from the projection 12 up to the sliding portion of the seal lip through the oil receiving piece 20 and the forward end face 4a of the seal lip 4 can be secured, thereby the oil can be supplied smoothly.

Incidentally, it is presumed that the oil receiving piece 20 may interfere with the inner peripheral surface 12a of the projection 12 when the shaft 23 moves eccentrically with respect to the housing 21, however, it has little effect on the sealing operation of the seal lip 4, since the oil receiving piece 20 can be made of thin film and flexible as mentioned above. Further, the oil receiving piece 20 is formed in an annular shape in this embodiment, however, a plurality of oil receiving pieces may be provided circumferentially so as to correspond to the plurality of projections 12 provided circumferentially, thereby it is possible to fulfill the function of the oil receiving piece in itself. Further, an oil receiving piece formed in the annular shape may be provided with notches or holes formed partially on the circumference.

Tenth Embodiment

Figure 21:
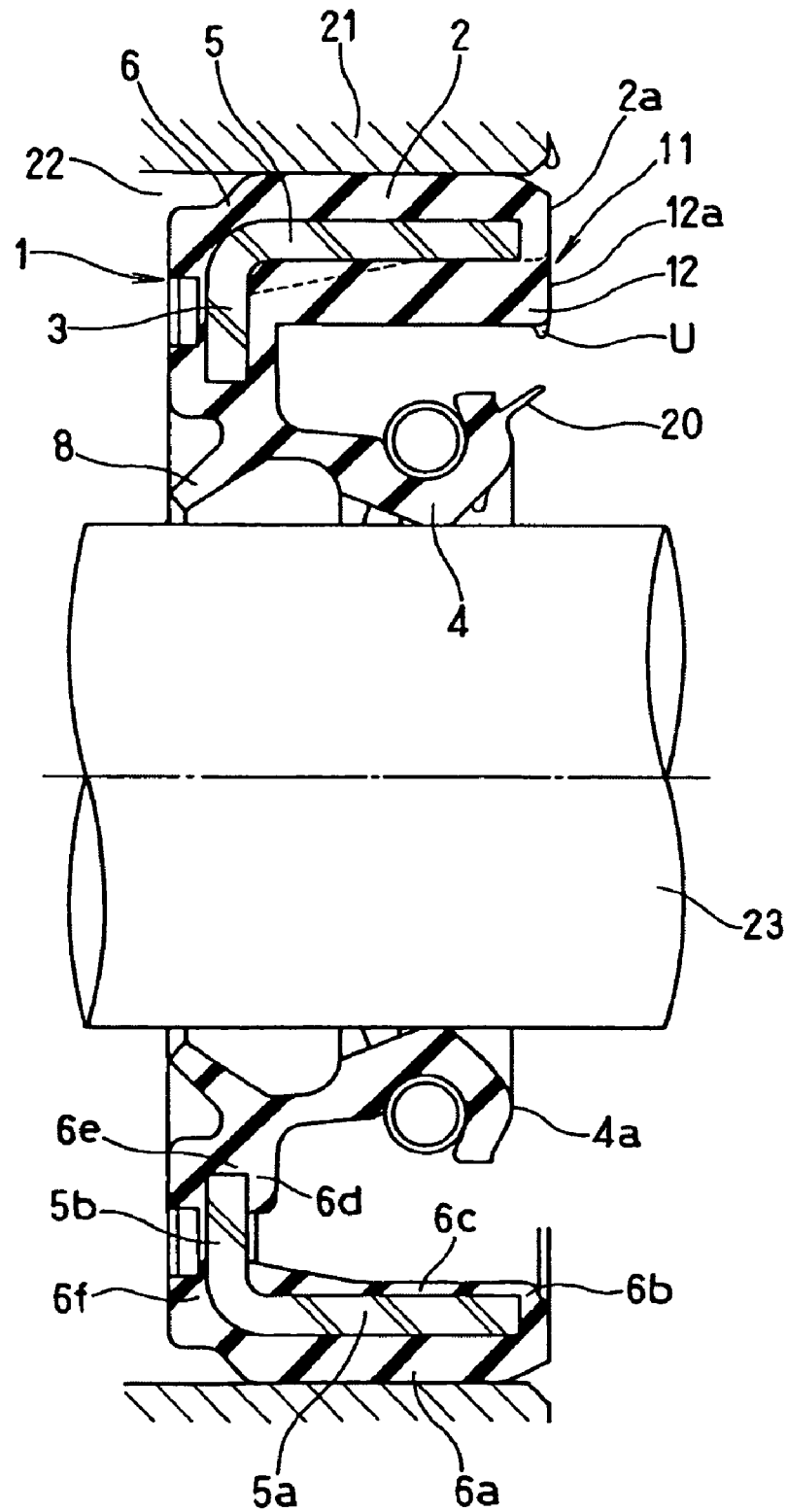
FIG. 21 is a sectional view of an oil seal according to a tenth embodiment of the present invention.
Figure 22:
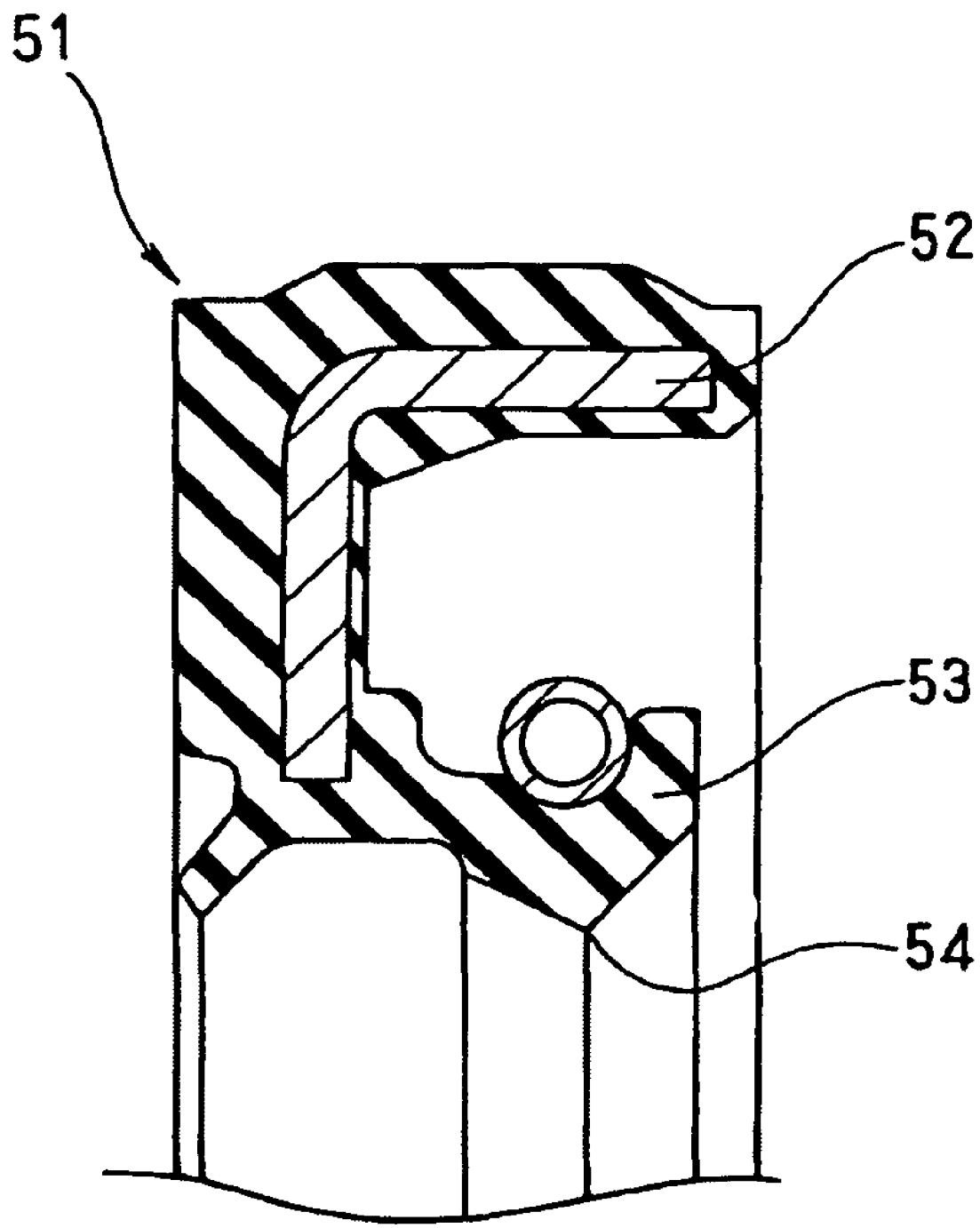
FIG. 22 is a sectional view showing a main part of a conventional oil seal.

Furthermore, the location where the oil receiving piece 20 is formed is not limited in particular but may be anywhere the oil dropping from the projection 12 can be received. In the present embodiment shown in FIG. 21, the oil receiving piece 20 is provided on the forward end face 4a of the seal lip 4 at a position which is slightly shifted radially inward from the outermost peripheral portion thereof.

What is claimed is:

1. An oil seal comprising
an annular installation section fitted to a housing and a seal lip provided slidably in close contact with a peripheral surface of a shaft,
a lubricant oil supply section being provided at a forward end region of the installation section to collect oil adhered thereon and to make the oil drop on the shaft,
the lubricant oil supply section having a plurality of projections provided circumferentially on an inner peripheral surface of the installation section so that the oil is collected on a surface of the projections,
guidance projections being provided on the surface of the projections to collect the oil.

2. An oil seal comprising
an annular installation section fitted to a housing and a seal lip provided slidably in close contact with a peripheral surface of a shaft,
a lubricant oil supply section being provided at a forward end region of the installation section to collect oil adhered thereon and supply the oil to a sliding portion between the shaft and the seal lip,
the lubricant oil supply section having a plurality of projections provided circumferentially on an inner peripheral surface of the installation section so that the oil is collected on a surface of the projections,
guidance projections being provided on the surface of the projections to collect the oil.

\* \* \* \* \*